United States Patent [19]
Rentschler

[11] 3,752,049
[45] Aug. 14, 1973

[54] CAMERA APPARATUS HAVING FLASHBULB AND SHUTTER CONTROL

[75] Inventor: Waldemar T. Rentschler, Calmbach, Germany

[73] Assignee: Prontor-Werke Alfred Gauthier GmbH, Calmbach/Schwarzwald, Germany

[22] Filed: July 8, 1971

[21] Appl. No.: 160,660

[30] Foreign Application Priority Data
July 10, 1970 Germany.................. P 20 34 298.7

[52] U.S. Cl. ................ 95/11 L, 95/11.5 R, 240/1.3
[51] Int. Cl. ........................ G03b 15/04, G03b 9/70
[58] Field of Search ...................... 95/11 R, 11.5 R, 95/11 L; 240/1.3; 431/92, 93

[56] References Cited
UNITED STATES PATENTS

| 3,590,706 | 7/1971 | Millet | 95/11.5 R |
| 1,307,220 | 6/1919 | Straight | 95/11.5 R |
| 3,589,255 | 6/1971 | Harvey | 95/11.5 R |

Primary Examiner—Robert P. Greiner
Attorney—Arthur A. March

[57] ABSTRACT

The invention is directed to a camera having flashbulb attachment connected therewith. The bulbs are ignited by a mechanical trigger associated therewith and tensioning means are secured to the base so that upon release the impact produces ignition of the flashbulb. With the camera there is a shutter arrangement provided with a point of attachment from which the mechanical force necessary for release of the impact member may be obtained.

12 Claims, 19 Drawing Figures

Patented Aug. 14, 1973

INVENTOR
Waldemar T. Rentschler
BY
Arthur A. March
ATTORNEY

INVENTOR
Waldemar T. Rentschler
BY
Arthur A. March
ATTORNEY

Patented Aug. 14, 1973

INVENTOR
Waldemar T. Rentschler
BY
Arthur A. March
ATTORNEY

CAMERA APPARATUS HAVING FLASHBULB AND SHUTTER CONTROL

The present invention concerns a camera comprising attachment means, provided on the case, for a flashbulb device attachable to the camera.

Flashbulbs are known which require no battery for their ignition. These flashbulbs are provided with a detonating cap which is filled with priming composition and is exploded by mechanical impact. The resultant spark or ray of sparks ignites the ignition thread in the flashbulb, thereby suddenly initiating the combustion process of the entire flashbulb filling and thus causing the radiation of light from the lamp. These flashbulbs are particularly offered in the ready-made form of flash cubes.

A torsion spring is used with these flash cubes as impact member, which mechanically triggers the ignition process and is associated with each individual flashbulb, the spring being secured to the base of the flashbulb and having the form of a hairpin with an adjoining end piece bent at right angles. This free end piece is set in a tensioned condition by the firm manufacturing the flashcube, in which condition it is held by means of a pin also secured to the base of the flashbulb. To release the impact wire, its free end must be raised in an axial direction over the securing pin, whereby the energy stored in the torsion spring is released and when the impact wire strikes the detonating cap, igition of the flashbulb is induced. Thus a mechanical control movement is required to ignite the flashbulb in dependence on the operation of the shutter, i.e., for the synchronising of the shutter movement and ignition. This mechanically controlled movement is effected by a member moved by the shutter operation and effects the release of the impact wire in the above described manner.

Therefore, as far as conventional cameras provided for the use of the new flashbulbs are concerned, these cameras are provided without exception with a fitted flashbulb or flashcube holder, the flash device itself forming a component of the camera, which is equivalent to saying that the synchronising mechanism between the shutter and the flashbulb can be produced without special problems.

The object of the present invention is therefore to produce in a favourable manner the conditions for the possibility of using the new flashbulb also in combination with cameras which are not provided with a fitted flash device, i.e., with which such a device is to be attached to the camera only when needed, by suitable design of a camera, as also of a flash device suitable for receiving the new flashbulbs.

In order to achieve this object it is proposed, in accordance with the present invention that, for the purpose of taking flashbulb photographs with the use of a flashbulb device having at least one lamp ignitable by impact effect by means of an initially tensioned impact member, the camera or shutter case is provided with a point of attachment from which the mechanical force necessary for the release of the impact member may be derived. In this manner, the novel flashbulb ignitable by impact effect may also be used on those cameras whose design is not based, particularly that of the shutter mechanism, on the use of impact-ignitable flashbulbs.

In a preferred embodiment of the invention, it is also proposed, according to the present invention, that the flash device provided for use with a camera should be fitted with a flexible force transmission cable having an end piece which can be coupled to an abutment corresponding to the point of attachment on the side of the camera for tapping the force. According to a further feature, the transmission of the force in the device is also achieved by a power cable which is preferably in one piece with the cable to be attached to the force tapping point on the camera.

In order to ensure trouble-free attachment of the power cable to the flash device or the camera from the point of view of operation, it is also proposed in accordance with the present invention that the coupling of the power transmission cable to the point of attachment on the side of the camera, for tapping power is effected by means of a screw, bayonet or insertion and snap connection.

In order to achieve a cableless attachment of the flash device to the camera it is proposed that the point of attachment for tapping power is arranged near the mounting shoe of the camera for the device, and that the end piece of a connection serving for the transmission of force in the flash device is disposed exactly opposite to the power tapping point on the mounting shoe. In order to connect the flash device and the camera together effortlessly and without difficulty, the power plunger, i.e., the transmission members of the camera and flash device producing the release of the impact wire, is in the "retracted" condition except at the moment of ignition. So that, on the other hand, the release of the impact wire can take place without loss of movement for the transmission device, said transmission device in the flash apparatus is formed in a preferred embodiment of the invention in such manner that the transmission plunger on the side of the device is spring-loaded, and its face is disposed directly behind the mounting surface of the device. Furthermore, it is proposed, in accordance with the present invention, that a non-positive connection between a part displaceable at the power tapping point of the camera and the end piece of the power transmission connection on the flash device, should be possible only when the device is mounted. An embodiment of the invention which is preferable both from the point of view of design and operation may be achieved by the feature that the mechanical force tapped at the point of attachment is derivable from a part serving for the drive of the camera shutter.

According to one feature of the invention, the release mechanism for the impact wire may be constructed so that the mechanical force capable of being tapped at the point of attachment may be derived from a spring drive simultaneously tensioned with the shutter drive, and lockable in the tensioned position by a separate locking device, said spring drive being released in turn by the triggered shutter drive.

An economic of embodiment of the invention which is simple particularly from the point of view of construction may be achieved in that a driving member of the shutter is provided with a lifting member such as a pawl acting on the end piece of the connection for transmitting power to the attachment point, which member, during the movement of the shutter, actuates the end piece, but slides past it with a deflecting movement during shutter cocking.

In order to give the photographer the possibility of carrying out a check on the flash device before taking a photograph, the arrangement of a sensing device is proposed in accordance with the present invention which serves to ascertain whether the flash lamp is ready for ignition before the camera is used, a scanning member being provided which finds the ignition impact member when actuated in its initially tensioned or untensioned position. Since the force necessary for releasing the impact wire is approximately 250p, the scanner member can be brought to the impact wire with a smaller pressure load sufficient for the testing process, without the risk of unintentional release existing.

In a preferred embodiment of the scanning device, actuation of the scanning member may be achieved by means of a special test button provided on the camera or on the flash device. According to another preferred embodiment, the scanner member of the sensing device may also be actuated dependently on the depression of the camera or shutter release. In order to leave the photographer free of the final decision on the practicability of a flashlight photograph, the arrangement of a locking device which is associated with the camera release, acts on said release and allows said release to be pressed only when the ignition impact member is in the tensioned condition, is proposed. Particularly when actuation of the scanning member of the sensing device is effected by means of a special press button, it appears advisable to provide a mark showing the photographer whether the impact member producing the ignition has assumed the tensioned condition or not. By the use of such a mark that may be provided on an already existing part moved during the testing process, the photographer can clearly decide on the readiness of the flash device for ignition.

Free use of flash devices of any type may be obtained according to another feature of the present invention in that the camera is provided both with a flash contact connection of conventional type for the attachment of a flash device for electrically ignited bulbs, as also with a point of attachment for receiving the mechanical force required for releasing an impact member in the case of bulbs having impact ignition.

In order to obtain maximum simplicity of operation in a flash device which provides for the use of flash cubes, the fitting of a spring drive tensioned dependently on the further movement of the flash cube is proposed, by means of which the ignition impact members of the flashbulbs are releaseable from the tensioned condition and which in turn may be released by the force derived from the camera. In this case, the movement of the force transmitting device controlled by the shutter may be kept very small, since in this movement only the spring drive on the side of the flash device has to be released. Apart from the advantage of considerable reduction of movement relatively to the direct release of the impact wire by the shutter, there is the additional feature that the release of the impact wire can be produced by means of a relatively weak force, since a much lower power requirement is sufficient for actuating the lock of the spring drive than the power necessary for releasing the impact wire which is approximately of the order of 250p.

Details of the invention are apparent from the following description and the drawings, showing several embodiments of the present invention in which.

Figure 1:
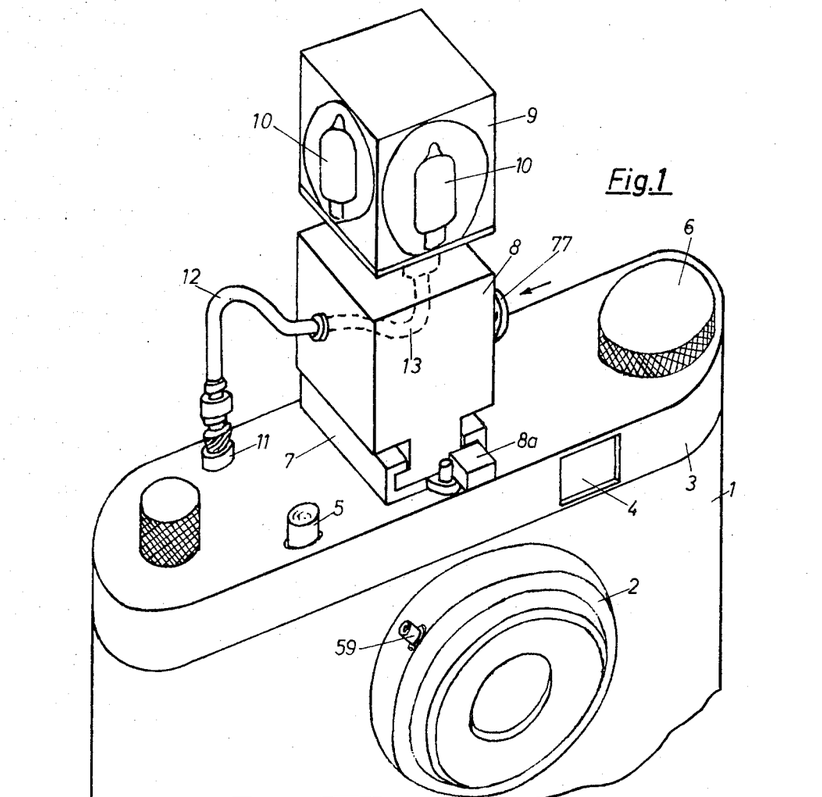
FIG. 1 is a partial perspective view of a camera on the mounting shoe of which a flash device is fixed, said device carrying a flash cube with bulbs ignitable by impact effect and attached by a flexible cable to the power tapping point on the camera.
Figure 2:
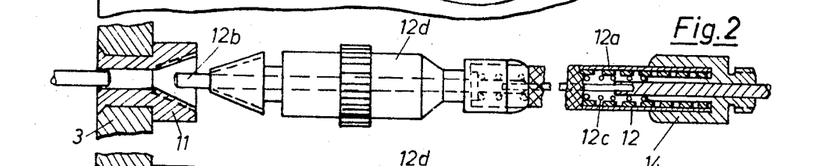
FIG. 2 shows the power cable in conjunction with the power tapping point on the side of the camera, to which point the end of the cable may be attached, for example, by means of a taper thread.
Figure 3:
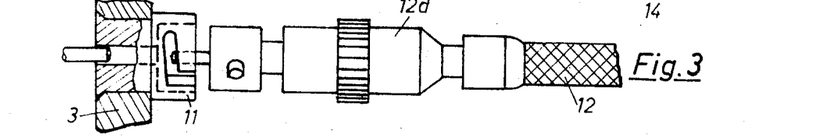
FIG. 3 shows the end piece of the cable and the power tapping point on the side of the camera, constructed as a bayonet connection.
Figure 4:
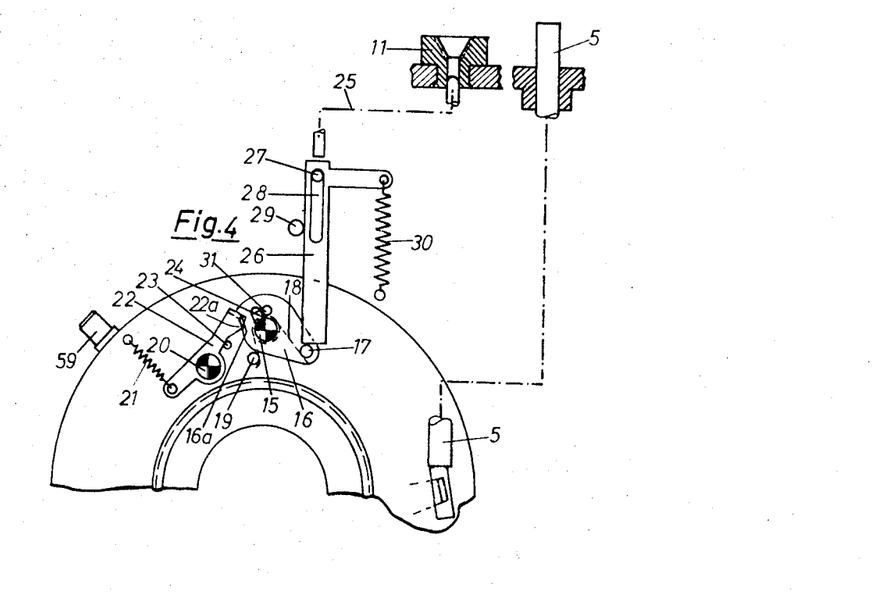
FIGS. 4 – 7 are views substantially restricted to the power tapping point on the side of the camera and the rear view of an objective lens shutter, said shutter, provided with a special tensionable spring drive for the power tapping point being shown first in the tensioned condition (FIG.4), then in a movement phase directly after release by the shutter driving mechanism (FIG. 5), then after the disengagement of the spring drive (FIG. 6) and finally during the tensioning process (FIG. 7)
Figure 5:
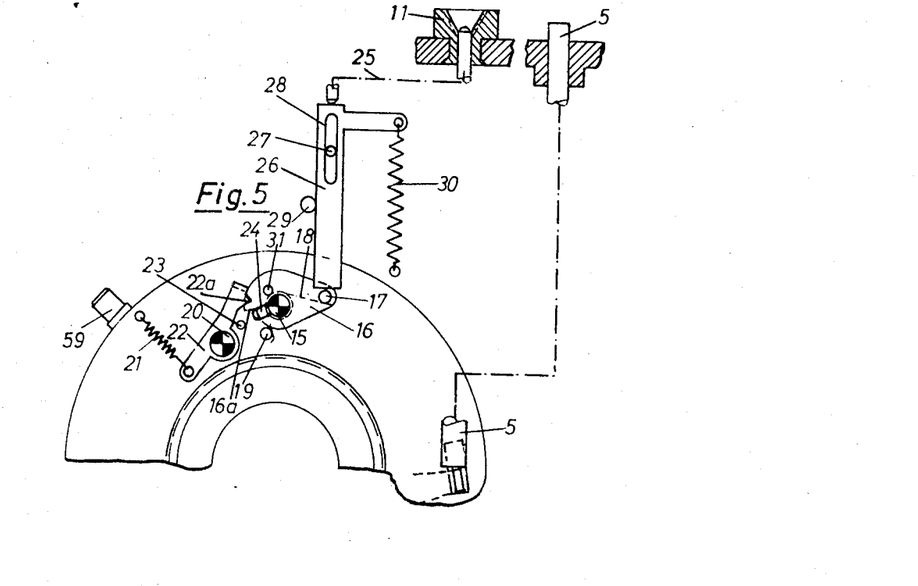
Figure 6:
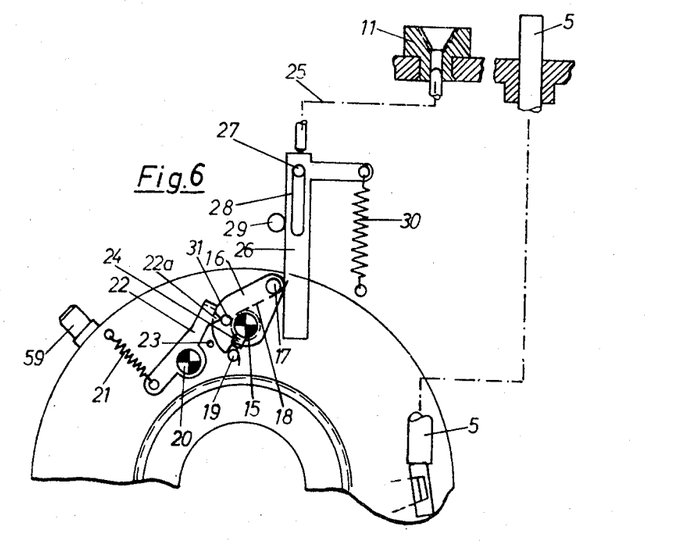
Figure 7:
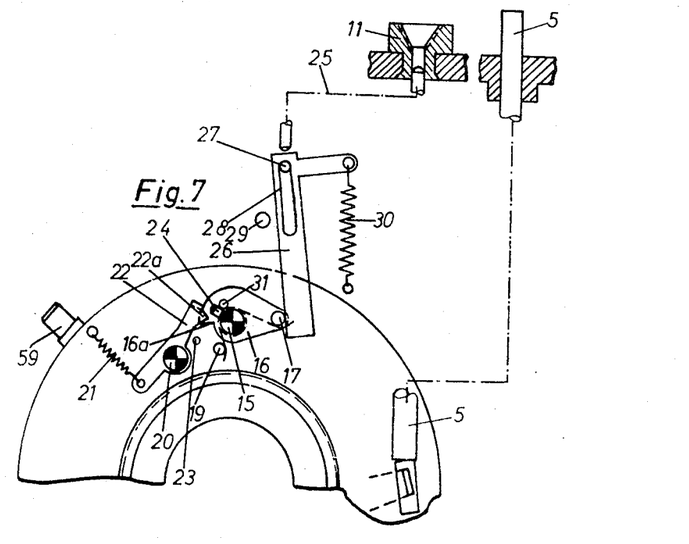
Figures 16, 17, 18:
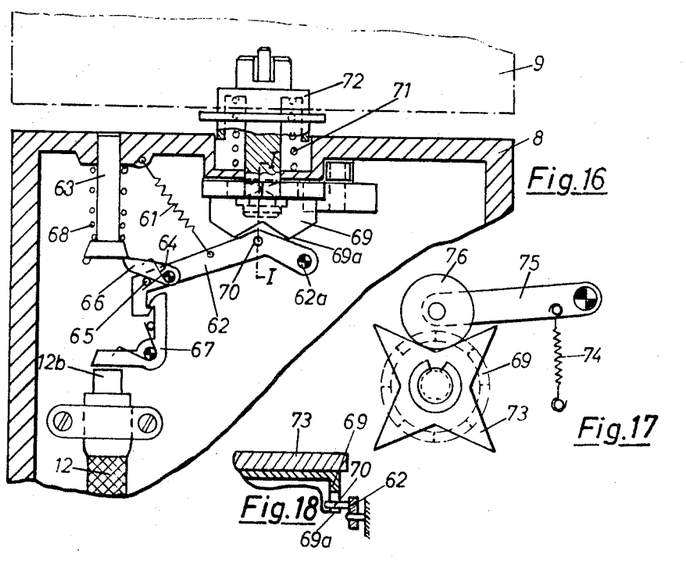
FIG. 16 is a cross-section through a flash device serving to receive flash cubes and attachable to the camera, and comprising a special spring drive brought to the tensioned position dependently on the movement of the flash cube and serving to release the impact member producing the ignition of the flash cube.
FIG. 17 is a view of the device for securing the position of the flash cube holder.
FIG. 18 is a partial cross-section through the pot-shaped tensioning member of the spring drive, provided with lifting cams, along the line 1 — 1 in FIG. 16.
Figure 19:
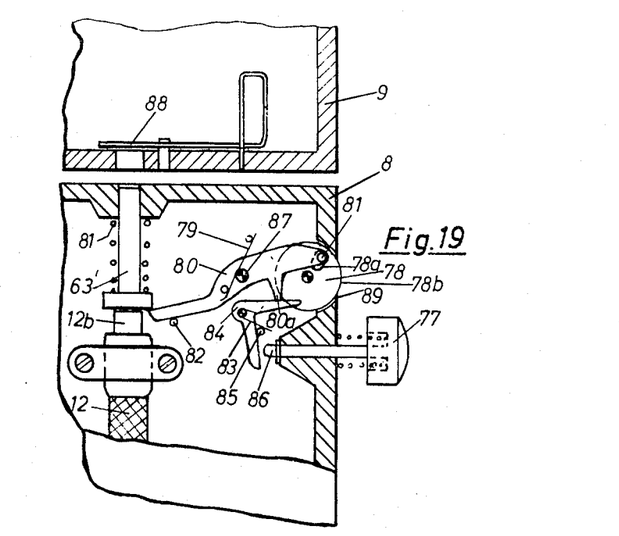
FIG. 19 is an embodiment of a sensing device actuated by a separate test button and provided in the flashlight device, for ascertaining whether the flashbulbs to be ignited by impact are ready for use.

In FIG. 1 of the drawings, 1 indicates the case of a camera provided with an objective lens shutter 2, 4 the view finder, 5 the camera release button, 6 the shutter wind knob serving simultaneously for the film feed, and 7 the mounting shoe provided in general for the attachment of a flashbulb device. 8 is a flashbulb device to be slipped on the mounting shoe, said device being suitable for receiving a flash cube 9, the special feature of which is that it is provided with several flashbulbs 10 each having a detonation pill and ignitable by impact action. Associated with each of these flashlamps is an impact wire also incorporated in the cube, which is subjected to initial tension and secured in the tensioned condition by a pin. The impact wire has to be moved out of the secured tensioned position by a sufficient force in order to produce the ignition process, whereby the energy stored in the impact wire is released. When the impact wire strikes against the detonation pill in its path of movement, an initial ignition is produced in said pill which in turn induces combustion in the flashbulb. It is a condition for the use of such flash cubes in a conventional camera that a force starting from it or caused by it with the release of the camera shutter, is released for releasing the impact wire. For this purpose, according to the embodiment shown in FIG. 1, the camera may be provided with a power tapping point 11, at which a force arrives derived from the shutter drive or released dependently on the movement of this drive. For transmitting the force required for releasing the impact wire from the power tapping point 11 on the side of the camera to the flash device 8 or flash cube 9, a flexible power cable 12 is provided which may be constructed in the manner of a wire trigger according to the embodiment shown in Fig. 1. As shown in FIG. 2, such cables are normally provided with a pressure transmitting metal wire 12b or plunger displaceably guided in a jacketed enveloping spiral 12a, and subjected to the force of a spring 12c producing its immediate return after the relief from pressure. FIGS. 2 and 3 show embodiments which may be used for the attachment or connection of the power cable 12 to the power tapping point 11 on the side of the camera. Then, according to FIG. 2, the coupling of the end piece 12d of the power cable 12 to the power tapping point 11 is formed as a screw thread with a tapering or conical shape. Alternatively according to FIG. 3, a bayonet connection or a plug and snap connection (not shown) could be used for the attachment of the power cable 12 to the power tapping point 11 and provided with a corresponding abutting member. The attachment of the other end of the power cable 12 to or in the flash device 8 is achieved either by means of a simple threaded bush 14 (FIG.2) enclosing the end of the covering of the power cable 12, or by means of a clip (FIGS. 16 and 19). The power cable 12 which supplies power to the flash device for releasing the impact member, may be coupled for transmitting power to a cable 13 disposed in the flash device, or the power transmitting member may be formed as a unit from a single continuous cable.

As far as the tapping or derivation of power for supplying the power tapping point 11 on the side of the camera is concerned, according to the embodiment shown in FIGS. 4 - 7, a special spring drive may be provided which substantially comprises a disc 16 rotatably mounted on the tensioning shaft 15 of a driving mechanism serving to open and close the shutter sectors. This disc carries a driving pin 17 which is located externally of the axis of rotation and with which a driving spring 18 engages, the other end of which is supported on a stationary pin 19 and which enables sufficient power to be stored for releasing the impact wire of the flashbulb 10. A projecting locking edge 16a is formed on the disc 16 for locking in the tensioned condition shown in FIG. 4, and rests on the front end of a locking lever 22 rotatably journalled on a pin 20 and biassed by a spring 21. A pin 23 is provided for securing the locking position of the lever 22. Disposed on the end of the bar 22 facing the disc 16 is a rejecting edge 22a which lies in the path of a pin 24 fixed on the tensioning shaft 15. If the driving mechanism of the sectors is released by means of the shutter or camera release button 5 indicated in chain dotted lines in FIGS. 4 - 7, the tension shaft 15 executes a rotation anti-clockwise, relatively to FIGS. 4 and 5, the result of which is that the pin 24 strikes against the rejecting edge 22a of the locking lever and displaces it from the locked position shown in FIG. 4. When the locking lever 22 becomes disengaged from the projecting locking edge 16a of the disc 16, said disc begins to move under the bias of the relatively powerful spring 18 engaging thereon, and the driving pin 17 provided on the disc 16 acts on a slide 26 in the shutter housing and pushes it endwise. In the path of movement of the slide 26 moved linearly by means of a pin and slot guide 27, 28 and an additional pin 29, there is a power transmitting member conveying the force to the attachment point 11, which power transmission member may be a flexible power cable 25, similarly to cables 12 or 13 accord to the chain dotted line shown in FIGS. 4 - 7. Instead of the cable 25, rigid intermediate members may also be used if this should prove more convenient for construction. In the course of the rotation of the disc 16, the driving pin 17 describing a circular movement comes out of engagement with the slide 26 executing a linear movement, and this means that the slide rapidly returns to the released condition shown in FIG. 6 under the force of the return spring provided in the power cable 25, and assisted by the action of the spring 30 engaging on the slide itself.

During the subsequent cocking operation of the shutter drive, i.e., the transfer of the tension shaft 15 to the tensioned position, the disc 16 is driven by the contact of the control pin 24 with the pin 31 and rotated clockwise. The result of this is that the driving pin 17 on the disc 16 comes into contact with the side of the slide 26, whereby the latter, as may be seen from FIG. 7, executing a rotation about the guide pin 27, is forced out of the previously assumed position, overcoming the return force of the spring 30. At the same time the driving pin 17 moving over a circular path, again slides off the slide 26, and the consequence of this is that said slide, due to the action of the return spring 30, returns to the starting position shown in FIG. 4, in which it is again located in front of the driving pin 17 by its end face. In order to synchronise the flash with the opening of the sectors of the shutter, the arrangment of the control pin 24 effecting the unlocking of the disc 16 on the tensioning shaft 15 of the shutter driving mechanism is such, that the force producing the release of the impact wire of the flashbulb reaches the attachment point 11 during the opening phase $t_1$ of the shutter.

Figure 8:
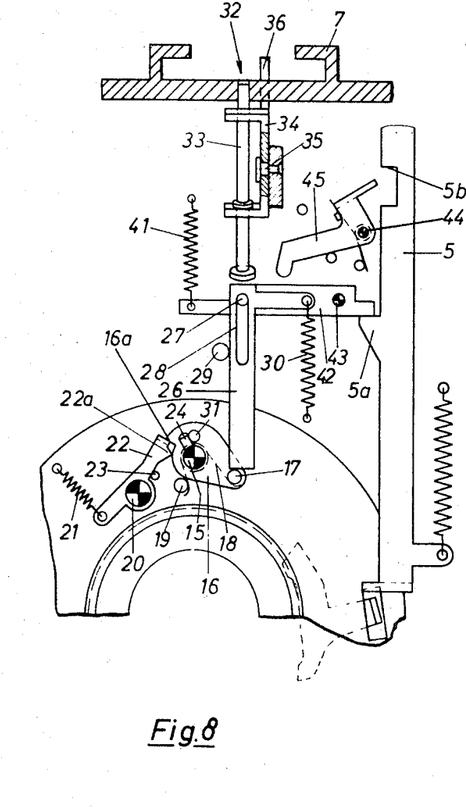
FIG. 8 shows the same spring drive for a power tapping point provided near the mounting shoe, said tapping point comprising a rotatably mounted intermediate member movable into the opposite position dependently on the attachment of a flash device, whilst in addition, a lock associated with the shutter or camera release is provided preventing the triggering of the shutter drive if, when the flash device is mounted, the bulb used for the flash is not ready for ignition.
Figure 9:
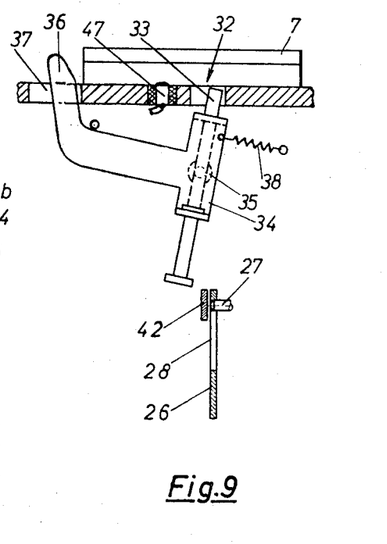
FIG. 9 is a side view of the pivotable intermediate member according to FIG. 8, in the inoperative position.
Figures 10, 11, 12:
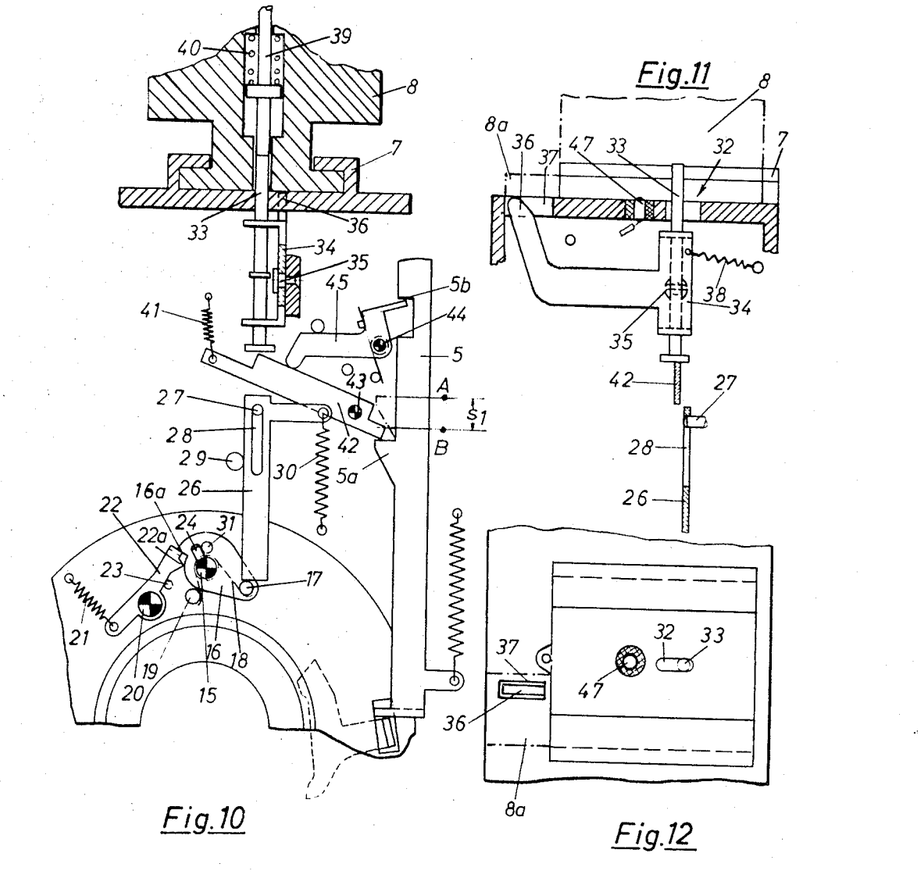
FIG. 10 shows the same arrangement as in FIGS. 8 and 9, after the insertion of a flash device on the mounting shoe and a trigger lock in the locked position.
FIG. 11 is a side view of the intermediate member in the position according to FIG. 10.
FIG. 12 is a plan view of the mounting shoe of the flash device.

FIGS. 8 and 10 show a spring drive for supplying a power tapping point 32 provided in the device slip-on shoe 7 of the camera. This drive is identical in construction and operation with the above described arrangement illustrated in FIGS. 4 - 7. The individual parts thereof are therefore provided with the same reference numerals as in the said figures. As an intermediate member for transmitting the impulse-like movement of the slide 26, however, this embodiment is provided with a rigid plunger 33 pivoting in and out of the path of movement of the slide, thus differing from the arrangement in FIGS. 4 – 7. The plunger 33 passes through an opening formed in the covering cap of the camera and representing the power tapping point. The plunger 33 is axially displaceable in a U-shaped stirrup 34, whilst said stirrup is in turn mounted to pivot on a stationary pin 35. By means of an arm 36 formed on the stirrup 34 and the outer end of which is able to project out of a slot 37 formed in the camera cap, the stirrup 34 may be influenced in respect of its position, namely, by means of a projection 8a formed on the flash device 8, in such manner that it is induced to swing into the operative position shown in FIG. 10, dependently on the insertion of the flash device 8, and to swing out again into the inoperative position shown in FIG. 9 under the bias of a spring 38 engaging the stirrup 34 when the flash device is removed. As soon, therefore, as the flash device 8, as shown in FIGS. 10 and 11, is inserted into the shoe 7, the plunger guide 34, 36 is influenced in its position against the bias of the return spring 38 in such manner that the plunger 33 moves into the path of the slide 26. When the spring drive 16–18 operates after the actuation of the release button 5, the power transmitted to the slide 26 is transferred to the plunger 33 which, in turn, acts on a pin 39 provided in the flash device 8 and releasing the impact wire of the flash bulb and, together therewith, returns immediately to the original position after releasing the impact wire under the bias of the spring 40.

As may also be seen from FIGS. 8 and 10, the device for loading the power tapping point 32 in the shoe 7 is associated with the lock co-operating with the camera or shutter release button 5, said lock being constructed on the succession system and comprising a rotatably mounted double armed lever 42 supported against an movement 5a of the release button 5 under the action of a spring 41. Another locking lever 45 also mounted stationary on a pin 44 is operatively associated with the lever 42 and enters a recess 5b provided on the release button and prevents further movement thereof, or the operation of the camera if a certain mvement is exceeded which the release button 5 traverses from its starting point A to point B which is identical with the movement of the release pin 39 on the impact wire. The movement, as indicated in FIG. 10 by $S_1$, can be exceeded in this manner if the release pin 39 which is guided in the flash device 8 and takes part in the movement of the release button 5 due to the successive movement of the double armed lever 42 and the plunger 33, does not previously find the impact wire effecting the ignition in the tensioned position. In order to ascertain this, it is only necessary for the photographer to depress the release button 5. However, in order to avoid any unintentional release action, the movement or lever conditions of the locking device 41 – 45 are selected so that the locking of the release button 5 takes place if the impact wire has not been previously tested, before the camera shutter is released for operation. In the other case, however, if the release pin 39 discovers the impact wire in the tensioned position, the successive movement of the lever 42 is terminated at the latest after travelling the path ($S_1$) to be traversed by the release button 5, and this means that the locking lever 45 may not enter the recess 5b and the release button 5 can be completely and freely depressed. The formation of a projection 8a on the flash device 8 and the arrangement of the arm 36 on the plunger guide 34, 36 enables the automatic operative engagement of the power transmitting members in the flash device to be set only when the said device is mounted, whilst a break in the power coupling is necessarily produced with the removal of the flash device. In order to ensure a reliable transmission of the power imparted to the plunger 33 to the release pin 39, it is proposed that the power tapping point 32 formed in the shoe 7 should be exactly in alignment with the bore serving to guide the release pin 39 in the shoe. Again, in order to enable the flash device 8 to be smoothly mounted, it must be ensured that the plunger 33 always returns from the vicinity of the shoe 7 after performing its function.

The power tapping point 32 in the shoe 7 may also be associated with a flash contact attachment 47 serving in known manner for the attachment of a flash device for electrically ignitable bulbs.

Figure 13:
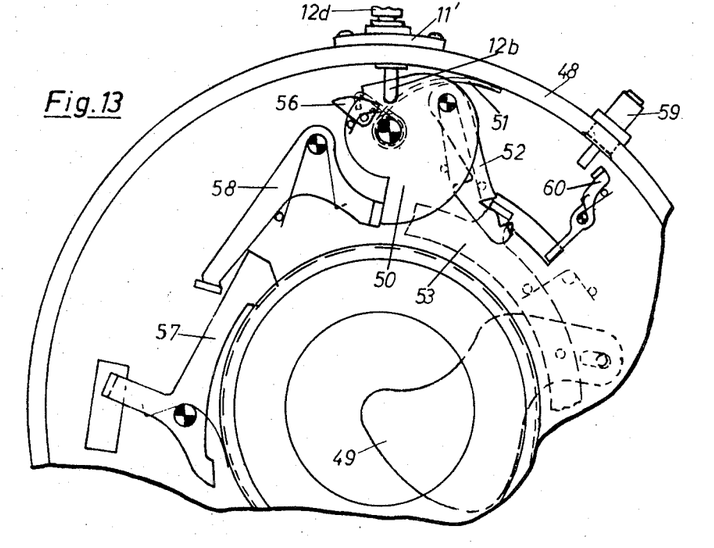
FIG. 13 is a partial view of a camera shutter with a lifting pawl arranged on the driving disc for the sectors and serving to actuate the power cable.
Figure 14:
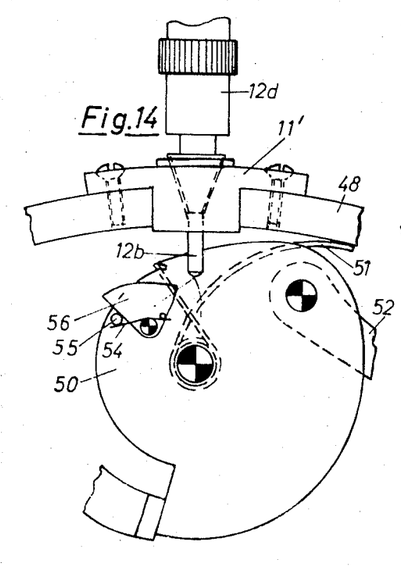
FIG. 14 shows the driving disc of the sectors on a magnified scale, also in the tensioned position.
Figure 15:
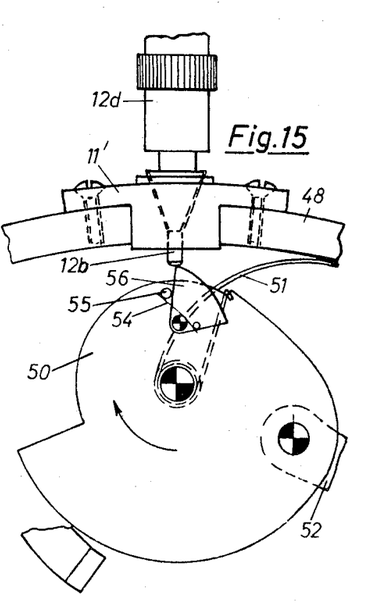
FIG. 15 shows the driving disc after the release, in a phase of movement during which the lifting pawl is driving power cable.

According to another embodiment shown in FIGS. 13 – 15, the power tapping point 11' serving for the attachment of the power cable 12 may also be directly provided on the casing 48 of a camera shutter. If a shutter is concerned in which, according to the illustration in FIG. 13, the sectors 49 are driven by means of a crank drive formed of driving disc 50, driving spring 51, thrust crank 52 and sector ring 53, the arrangement of the power tapping point 11' on the casing 48 is preferably such that when the power cable 12 is attached, its plunger 12b extends into the camera case. In order to influence the plunger 12b, a lifting pawl 56 mounted to rotate on the driving disc 50 the shutter and supported against a pin 55 at one end by the bias of a spring 54 may be provided which, after actuation of the release mechanism 57, 58 of the camera shutter, acts on the plunger 12b of the power cable 12 in the course of the rotation of the driving disc 50, and thereby produces an axial displacement of said cable 12, as shown in FIG. 15. If, subsequently, the shutter drive is then returned to the tensioned position (cocked), the lifting pawl 56 slides with a deflecting movement past the plunger 12b of the power cable 12 in order to assume the position shown in FIG. 14 again at the end of the cocking movement of the shutter drive. In the same manner, as described above, the power tapping point 11' on the shutter housing may also be associated with an additional flash contact device, consisting of flash nipples 59 and contact switch 50, serving to ignite electric flashbulbs.

FIG. 16 shows details of a flashbulb device which is provided with a special spring drive, for releasing the impact wire of the flash cube 9, brought to the tensioned position dependently on the flash cube feed or by means of a separate knob. The spring drive may comprise a lever 62 under the bias of a relatively strong spring 61 and mounted stationary, on the free end of which there is arranged a driving pawl 66 co-operating with a release pin 63 and supported against a stop 65 by means of a spring 64. The driving lever 62 is kept in a tensioned position by a stationary but rotatably journalled double armed locking pawl 67, one arm of which locks the driving lever in the tensioned position and the other arm of which is located in the range of movement of the plunger 12b of a power cable 12 attached to the power tapping point 11 or 11'. This means that the unlocking of the spring drive 61 – 66 is effected by means of a force derived from the shutter or camera drive, whilst the release of the impact wire of the flash cube 9 shown in FIG. 16 in broken lines, is effected by the spring drive itself which drives the unlocking pin 63 against the bias of the spring 68, and removes the impact wire from the secured position by means of said release pin 63.

In order to tension the spring drive 61 to 66 dependently on the rotation of the flash cube 9, i.e., to change the lever 62 to the tensioned position shown in FIG. 16, a bell-shaped switch cam 69 is connected to the flash cube recess 72, the number of switch cams 69a corresponding to the number of flashbulbs of the cube being formed on said cam. These switch cams cooperate with an adjusting pin 70 disposed within its range of action and with another pin 70 extending from the side of the lever 62, in such manner that the particular cam coming into action strikes against the pin and moves the lever 62 about its bearing axis 62a anticlockwise, whilst the spring 61 engaging thereon is set under increased pressure. In order to set the spring drive 61 – 66 under spring tension independently of the rotation of the flash cube, the flash cube recess 72 is axially displaceable in the housing of the device and supported thereon by means of a co-axial spring 71. If the spring drive 61 – 66 of the flash device is in the untensioned position when a flash cube is mounted, the photographer need only to press the flash cube recess 72, whereby the part connected to the bell-shaped curve 69 forces the lever 62 into the tensioned position shown in FIG. 16 running against the adjusting pin 70 over said path. At the end of the tensioning movement, in the course of which the driving pawl 66 slides with a deflecting movement past the release pin 63, the locking lever 67 hooks on the outer end of the driving lever 62, whereupon the latter remains in the tensioned position. The flash cube recess 72, however, returns to its original position after release from pressure. FIG. 17 shows a device by means of which the flash cube recess 72 may be secured in the particular position assumed. This device substantially comprises a star-shaped structure 73 which is non-rotatably connected to the curved bell 69 and with which a locking lever 75 subjected to the traction of a spring 74 co-operates. The locking lever 75 is mounted stationary and at its free end has roller 76 reducing the frictional resistance between the lever 75 and the star 73.

FIG. 19 shows means which may be fitted in a flash light device, for example in a device according to FIG. 16, by means of which it is possible, by actuating a separate test button 77, to ascertain whether the impact member producing the ignition of a flash bulb is in the tensioned position or not. According to the embodiment illustrated, the testing device may be formed of a rotatable disc 78 co-operating with a double armed pressure lever 80 subject to the bias of a spring 79, for which purpose the arm of the lever 80 facing the disc has a pin 81 which engages in a radial slot 78a provided in the disc. At the other end the pressure lever 80 fixed in the starting position by a pin 82, is in contact with a release pin 63' which exerts the same function as the pin 63 of the device according to FIG. 16 and which is axially displaceable against the force of a spring 81 by a plunger 12b of a power cable 12. Furthermore, the arm of the pressure lever 80 facing the disc 78 has a projection 80a with which there is associated an arm of a stationary bell crank lever 84 loaded by a spring 83. The bell crank lever 84 secured in the basic position by means of a pin 85, keeps the pressure lever 80 in the position shown in FIG. 19 until the test knob 77, operated by means of a pin 86 in the housing, is actuated. When this happens, the pin 86 strikes against the arm of the bell crank lever 84 facing it and this means that the support of the pressure lever 80 is now reduced, whereupon the pressure lever 80 serving both for the drive of the release pin 63' and also of the disc 78 executes a clockwise rotation about its axis 87 under the bias of a spring 79. If the relase pin 63' discovers the impact wire 88 to be in the tensioned position during the testing process, the disc 78 moved together with the pressure lever 80 comes to a stop after passing through a relatively small angle. The disc 78, however, passes through a bigger angle when the release pin 63' moved by the pressure lever 80 is idling. This case may occur when the impact wire 88 present in the flash cube 9 is outside the tensioned position.

In order to make the result of the testing process visible to the photographer, the disc 78 in operative engagement with the pressure lever 80 may be arranged in the housing of the flash device so that its peripheral surface 78b is partially exposed by an aperture 89 formed in the housing. The part of the periphery of the disc 78 passing through the aperture in the housing may be provided with different inspection marks, consisting of surfaces of different colours. The arrangment of coloured surfaces may be selected relatively to the circumference of the disc 78 so that, when passing through a small angle, a green surface is visible first, which, when passing through a larger angle, changes to a red surface. Thus, if the green portion of the surface appears in the aperture 89 of the housing, this indicates to the photographer that the impact wire 80 is in the tensioned position. If, however, the red portion of the surface is visible, this means that the flash bulb provided for taking a flash photograph is not ready for ignition.

In order to achieve a flexible connection of flash device and camera, as is advantageous for various types of photographs, e.g., for lateral lighting of the object to be photographed, or indirect flash, the flash device may be provided with a power transmitting cable. This cable for example may be a wire release connecting member (such as a pistol grip) which is attached to the power tapping point at one end by means of a bayonet connection or the like.

What is claimed is:

1. An attachment device for securement to a camera case to provide for a flashable attachment to the camera for taking flashlight photographs, means to secure the attachment to the camera case, a camera shutter means, means for controlling and releasing the camera shutter at selectable time periods thereby to expose a film within the camera, a flexible cable, means for activating the shutter for photographic purposes, a flashlight device having at least one bulb ignitable by impact action, an initially tensioned impact body means for effecting ignition of the bulb, means on the camera case to provide for attaching the activator control cable thereto, said flexible power transmission cable having one end piece thereof coupled to the attaching means on the camera case to provide a point of attachment on the side of the camera, and means provided through the cable for controlling the release of the tensioned impact body to provide the power to ignite the flash lamp and control the shutter.

2. A flash device for a camera according to claim 1 wherein the means for transmitting power to the attachment device, comprises a power cable means, means to connect said cable to form it into a single piece, and a tapping means through which the cable is connected to the camera.

3. A camera and flash control device according to claim 1 comprising, in addition, a readily detachable snap connection for coupling the power cable to the point of attachment on the camera for tapping the power.

4. A camera and flash control device according to claim 1, comprising, in addition, means associated with the attachment point for tapping power in the region of the securement means of the attachment to the camera and connection means positioned substantially at the cable end serving for transmitting power to the flash device when the device is secured on the camera, and means to position the cable end in alignment with the power tapping point on the shoe.

5. A camera and flash control device according to claim 4, comprising, in addition, means to establish a releasable connection between a movable means at the power tapping point and the end piece of the power transmitting connection in the flash device at time periods only when said device is mounted.

6. A camera having a shutter means and a flash control means as claimed in claim 1 comprising, in addition, means to derive mechanical power to open and close the shutter section from the attachment point conjointly with the means to drive the camera shutter.

7. A camera as claimed in claim 6, comprising, in addition, a spring drive lockable in the tensioned conditon to provide the mechanical power at the cable attachment point, a locking means, means to tension the drive simultaneously with the shutter drive, and means to release the spring means simultaneously with the release shutter drive.

8. A camera as claimed in claim 7 comprising, in addition, a flexible power transmitting cable for transmitting the mechanical force from the shutter drive to the attachment cable attachment point.

9. A camera according to claim 6, including, in addition, a pawl to provide a lifting member on the end piece of the connection for transmitting power to the attachment point on a driving member of the shutter, means to actuate the end piece of the lifting member during the movement of the shutter, and means to slide the lifting member past the shutter with a deflecting movement during the tensioning of the drive.

10. A camera and flash device according to claim 1 including a lock associated with the release button and acting thereon, said lock permits depression of the release button only when the ignition impact member is in the tensioned position.

11. A camera according to claim 10 comprising also a flash contact attachment for the attachment of a flash device for electrically ignitable bulbs and means for attachment of the contact for deriving mechanical power for releasing an impact member to ignite the flash bulb.

12. A flash device according to claim 11 when used in combination with flash cubes, including also a spring drive, means to tension to the drive dependently on the feed of the flash cube to drive the ignition impact members of the flash bulbs to a releasable position from the tensioned position which is in turn releasable by the force derived from the camera.

* * * * *